US009072033B2

(12) United States Patent
Mehta

(10) Patent No.: US 9,072,033 B2
(45) Date of Patent: Jun. 30, 2015

(54) SYSTEMS AND METHODS FOR CONCURRENT DEVICE DISCOVERY

(71) Applicant: QUALCOMM Incorporated, San Diego, CA (US)

(72) Inventor: Vipin Mehta, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 134 days.

(21) Appl. No.: 13/791,522

(22) Filed: Mar. 8, 2013

(65) Prior Publication Data

US 2014/0254422 A1  Sep. 11, 2014

(51) Int. Cl.
*H04L 12/28* (2006.01)
*H04W 48/16* (2009.01)
*H04W 8/00* (2009.01)

(52) U.S. Cl.
CPC .............. *H04W 48/16* (2013.01); *H04W 8/005* (2013.01)

(58) Field of Classification Search
CPC .............................. H04W 48/16; H04W 8/005
USPC ........................................................ 370/254
See application file for complete search history.

(56) References Cited

U.S. PATENT DOCUMENTS

| 2007/0274271 A1 | 11/2007 | Jones et al. | |
| 2012/0158839 A1* | 6/2012 | Hassan et al. | 709/204 |
| 2012/0249544 A1 | 10/2012 | Maciocci et al. | |
| 2013/0148545 A1* | 6/2013 | Jung et al. | 370/255 |

FOREIGN PATENT DOCUMENTS

| WO | 2007118126 A2 | 10/2007 |
| WO | 2009061592 A1 | 5/2009 |
| WO | 2010022156 A2 | 2/2010 |
| WO | WO-2012170794 A1 | 12/2012 |
| WO | WO-2012174152 A2 | 12/2012 |

OTHER PUBLICATIONS

International Search Report and Written Opinion—PCT/US2014/019638—ISA/EPO—Jun. 20, 2014.

* cited by examiner

*Primary Examiner* — Sai-Ming Chan
(74) *Attorney, Agent, or Firm* — Bay Area Technology Law Group PC

(57) ABSTRACT

Systems and methods are provided for performing multiple operations associated with a peer-to-peer network in parallel by using two or more independent transceivers. When performing a device discovery protocol, one transceiver may operate in a listen state and another transceiver may operate in a search state, so that an exchange of discovery messages may occur with a peer, regardless of whether the peer is in the listen state or the search state. In another aspect, one transceiver may be used to perform a device discovery protocol, allowing the other transceiver to maintain a communications link without interruption.

36 Claims, 6 Drawing Sheets

SYSTEMS AND METHODS FOR CONCURRENT DEVICE DISCOVERY

FIELD OF THE PRESENT INVENTION

This disclosure generally relates to wireless communication systems and more specifically to systems and methods for increasing for improving the efficiency of the peer device discovery and group operation procedure.

BACKGROUND OF THE INVENTION

An infrastructure wireless local area network (WLAN) operating under the Institute of Electrical and Electronics Engineers (IEEE) 802.11 standards typically involves the use of an access point to manage network functions and coordinate communications between one or more associated stations. To obtain benefits associated with a WLAN without the need for a dedicated access point, techniques exist for creating a network between two or more peers in an ad hoc or peer-to-peer network topology. WLAN devices may discover each other and share data traffic directly, without the instance of a traditional access point. This type of network configuration may be known as an independent basic service set (IBSS). One example of a peer-to-peer network is a Wireless Fidelity (WiFi) Direct™ network. As IBSS networks typically do not have a distribution system or other dedicated device to control the network, one peer may undertake certain management functions by acting in the role of peer-to-peer group owner (P2P GO) and one or more additional devices may associate with the GO as P2P clients.

In order to form a peer-to-peer network, participating devices generally initiate a communications link through a device discovery process. A find phase involving a search state and a listen state may be configured to facilitate the ability of unassociated devices to discover each other's presence on a common wireless channel. During the listen state, a device parks on one of a defined subset of wireless channels and waits for a probe request frame to be sent by another device. During the search state, the device switches between channels in the defined subset and transmits probe request frames. Discovery may occur when one device in the listen state receives a probe request sent by the other device and returns a probe response frame. As a result, successful discovery may require one device to be in the listen state while the other device is in the search state. Conventionally, a device may be configured to rotate between the listen state and the search state for random periods of time to increase the probability that complementary periods of search and listen will overlap with other devices so that discovery may occur. However, even with this provision, there may be periods when both devices are in the same state, which delays discovery.

The proliferation of devices communicating using wireless local area networks (WLANs) has led to the development of devices that feature multiple, independent transceivers that allow simultaneous operations to occur over one or more frequency bands. Examples include dual band dual concurrent (DBDC) technologies that allow a device to operate under 802.11 standards simultaneously in the 2.4 and 5 GHz bands by using separate transceivers. As implied by the name, DBDC generally implies that both transceivers are capable of supporting both bands and are able to operate concurrently. Likewise, a single band dual concurrent device (SBDC) may employ two separate transceivers to allow simultaneous operation in either the 2.4 or 5 GHz band, depending upon the configuration chosen. Dual concurrent devices offer the capability to perform independent operations in parallel using the respective transceivers.

Accordingly, it would desirable to coordinate operation of multiple concurrent transceivers to facilitate wireless communications, such as by enhancing a device discovery process. This disclosure achieves these and other goals.

SUMMARY

This disclosure includes systems for wireless communication. For example, a wireless communications device may have a first transceiver to exchange messages with at least one peer for performing a first operation associated with a peer-to-peer network, a second transceiver to exchange messages with at least one peer for performing a second operation associated with the peer-to-peer network, and a peer-to-peer manager for coordinating operation of the first transceiver and the second transceiver to perform the first operation and the second operation in parallel.

In one aspect, the first operation and the second operation may be find phases corresponding to a device discovery protocol. For example, the peer-to-peer manager may coordinate operation of the first transceiver by operating the first transceiver in a search state to transmit discovery requests. Further, the peer-to-peer manager may form the peer-to-peer network after receiving a discovery response. In another example, the peer-to-peer manager may coordinate operation of the second transceiver by operating the second transceiver in a listen state to receive discovery requests. Further, the peer-to-peer manager may transmit a discovery response after receiving a discovery request and form the peer-to-peer network.

In another aspect, the first operation may be maintaining a communications link with a first peer over the peer-to-peer network and the second operation may be a find phase corresponding to a device discovery protocol. For example, the peer-to-peer manager may coordinate operation of the second transceiver by cycling between operating the second transceiver in a listen state and operating the second transceiver in a search state. Further, the peer-to-peer manager may form a communication link with a second peer to the peer-to-peer network when receiving a discovery response from the second peer and may transmit a discovery response when receiving a discovery request from the second peer and form a communication link with the second peer.

The disclosure also includes methods for wireless communication. In one embodiment, the method may involve a wireless communications device having a first transceiver and a second transceiver and include performing a first operation associated with a peer-to-peer network with the first transceiver, performing a second operation associated with the peer-to-peer network with the first transceiver, and coordinating operation of the first transceiver and the second transceiver to perform the first operation and the second operation in parallel.

In one aspect, the first operation and the second operation are find phases corresponding to a device discovery protocol. For example, coordinating operation of the first transceiver may include operating the first transceiver in a search state to transmit discovery requests. Further, the peer-to-peer network may be formed after receiving a discovery response. In another example, coordinating operation of the second transceiver may include operating the second transceiver in a listen state to receive discovery requests. Further, a discovery response may be transmitted after receiving a discovery request and the peer-to-peer network may be formed.

In another aspect, the first operation may maintain a communications link with a first peer over the peer-to-peer network and the second operation may be a find phase corresponding to a device discovery protocol. For example, coordinating operation of the second transceiver may include cycling between operating the second transceiver in a listen state and operating the second transceiver in a search state. Further, the peer-to-peer network may be formed after receiving a discovery response. In another example, coordinating operation of the second transceiver may include operating the second transceiver in a listen state to receive discovery requests. Further, the peer-to-peer network may be formed after receiving a discovery response or a discovery response may be transmitted after receiving a discovery request and the peer-to-peer network may be formed.

This disclosure also includes a wireless communications device for performing multiple parallel operations in a peer-to-peer network using a first transceiver to exchange messages with at least one peer for performing a first operation associated with a peer-to-peer network, a second transceiver to exchange messages with at least one peer for performing a second operation associated with the peer-to-peer network, and means for coordinating operation of the first transceiver and the second transceiver to perform the first operation and the second operation in parallel.

In one aspect, the first operation and the second operation may be find phases corresponding to a device discovery protocol. For example, the device may include means for coordinating operation of the first transceiver by operating the first transceiver in a search state to transmit discovery requests. Further, the device may have means for forming the peer-to-peer network after receiving a discovery response. In another example, the means for coordinating operation of the second transceiver may operate the second transceiver in a listen state to receive discovery requests. Further, the device may have means for transmitting a discovery response after receiving a discovery request to form the peer-to-peer network.

In another aspect, the first operation may be maintaining a communications link with a first peer over the peer-to-peer network and the second operation may be a find phase corresponding to a device discovery protocol. For example, means for coordinating operation of the second transceiver may cycle between operating the second transceiver in a listen state and operating the second transceiver in a search state. Further, the device may have means for forming a communication link with a second peer to the peer-to-peer network when receiving a discovery response from the second peer and means for transmitting a discovery response when receiving a discovery request from the second peer and form a communication link with the second peer.

This disclosure may also include a non-transitory processor-readable storage medium for performing multiple parallel operations in a peer-to-peer network with a wireless communications device, the processor-readable storage medium having instructions thereon, the instructions including code for coordinating operation of a first transceiver to exchange messages with at least one peer in a peer-to-peer network and a second transceiver to exchange messages with at least one peer in the peer-to-peer network to perform a first operation using the first transceiver and a second operation with the second transceiver in parallel. The first operation and the second operation may be find phases corresponding to a device discovery protocol. The storage medium may also have code for operating the first transceiver in a search state to transmit discovery requests as well as code for forming the peer-to-peer network after receiving a discovery response.

In one aspect, the storage medium may have code for operating the second transceiver in a listen state to receive discovery requests. Further, the storage medium may have code for transmitting a discovery response after receiving a discovery request and forming the peer-to-peer network.

In another aspect, the first operation may be to maintain a communications link with a first peer over the peer-to-peer network and the second operation may be a find phase corresponding to a device discovery protocol. As such, the storage medium may have code for cycling between operating the second transceiver in a listen state and code for operating the second transceiver in a search state. In addition, the storage medium may have code for forming a communication link with a second peer when receiving a discovery response from the second peer and code for transmitting a discovery response when receiving a discovery request from the second peer and then forming a communication link with the second peer.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION

Figure 1:
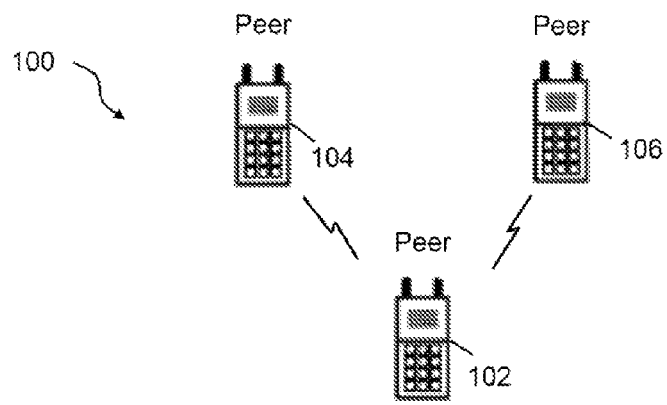
FIG. 1 schematically depicts a wireless communications system including a plurality of peers, wherein at least one peer has multi concurrent capabilities, according to one embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

This specification includes techniques for communicating between two wireless communications devices, each having at least two concurrent transceivers. By coordinating operation of two or more transceivers at each device, performance of the network may be improved. For example, the multi concurrent transceivers may be employed to provide parallel operation of multiple operations associated with a peer-to-peer network. Peer-to-peer communication may also be facilitated by performing a discovery process more efficiently. Other operational functions associated with peer-to-peer communication may also be performed simultaneously or in an otherwise coordinated manner using multi concurrent wireless communications devices.

To help illustrate the systems and methods of this disclosure, an exemplary wireless communication system 100 is shown in FIG. 1, including a first wireless communications device such as peer 102 that may form a communication link with another wireless communications device such as peer 104. As will be described below, peer 102 and peer 104 may initiate formation of the network by performing a device discovery protocol. In one embodiment, the peer-to-peer protocol being employed may involve one peer assuming certain managerial functions with respect to the network. For example, peer 102 may function as group owner and peer 104 may function as a peer client. Wireless communication system 100 may also include one or more additional wireless communications devices, such as peer 106, which may form a peer-to-peer network communication link as additional peer clients. Generally, the choice of which peer functions as group owner may be negotiated at the time the network is formed. Further, as desired, any or all peers may have the capability of functioning in either role.

Figure 2:
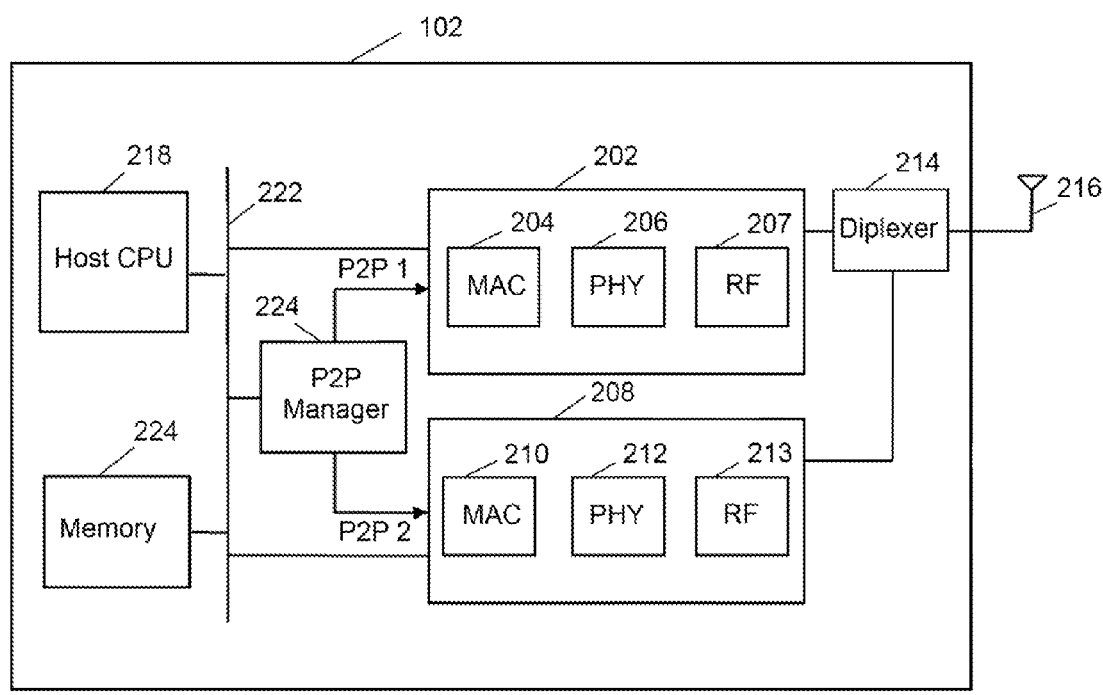
FIG. 2 schematically depicts functional blocks of a multi concurrent peer configured to perform multiple operation associated with a peer-to-peer network in parallel, according to one embodiment of the invention.

Additional details regarding one embodiment of peer 102 is depicted with high level schematic blocks in FIG. 2. In this embodiment, peer 102 has a dual concurrent device configuration, such as a SBDC device or a DBDC device, having two independent transceivers configured to operate according to a suitable wireless communications protocol, such as one conforming to an IEEE 802.11 protocol. Generally, peer 102 may employ an architecture in which the lower levels of the WLAN protocol stack are implemented in firmware and hardware of each WLAN transceiver. As shown, peer 102 may include first transceiver 202 having a media access controller (MAC) 204 that performs functions related to the handling and processing of 802.11 frames of data including verification, acknowledgment, routing, formatting and the like. MAC 204 exchanges incoming and outgoing frames with physical layer (PHY) 206 and radio (RF) 207, which as shown here includes the functions of modulating the frames according to the relevant 802.11 protocol as well as providing the analog processing and RF conversion necessary to provide transmission and reception of wireless signals. Further, peer 102 may also include second transceiver 208 having equivalent MAC 210, PHY 212 and RF 213 blocks. In the depicted embodiment, first transceiver 202 and second transceiver 208 are coupled to diplexer 214 to share antenna 216. As desired and depending upon other wireless protocols employed, one or more antennas may be shared between additional transceivers using switching techniques known in the art. First transceiver 202 and second transceiver 208 may also have separate antennas. Likewise, some or all elements of the respective transceivers may be collocated on a common system, e.g., on the same circuit board or on distinct circuit boards within the same system, or may be embedded on the same integrated circuit as in a system on a chip (SoC) implementation.

Peer 102 also includes host CPU 218 configured to perform the various computations and operations involved with the functioning of peer 102, including the functionality associated with the upper layers of the WLAN protocol stack, as noted above. Host CPU 218 is coupled to first transceiver 202 and second transceiver 208 through bus 220, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Memory 222 may be coupled to bus 220 to store transmitted and received information and processor-readable instructions, such as software, related to operation of host CPU 218. As shown, peer 102 may include P2P manager 224 to coordinate operation of transceiver 202 and transceiver 208 to perform multiple operational functions associated with the peer-to-peer network in parallel. For example, P2P manager 224 may perform a first peer-to-peer network operation (P2P 1) using transceiver 202 and may perform a second peer-to-peer network operation (P2P 2) using transceiver 208.

P2P manager 224 may be implemented in software, such as in the form of instructions stored in memory 222, in firmware, in hardware, or in any combination thereof.

In one aspect, peer devices may initiate a communications link through device discovery protocol involving a search state and a listen state. The discovery protocol may be configured to facilitate the ability of unassociated devices to discover each other's presence on a common wireless channel. In one aspect, a peer may operate in a listen state, during which the peer parks on one of a defined subset of wireless channels and waits for a probe request frame to be sent by another device. In another aspect, a peer may operate in a search state, during which the peer switches between channels in the defined subset and transmits discovery requests, such as by sending probe request frames.

Discovery may occur during a discovery opportunity that may exist whenever a peer is one state and the other peer is in a complementary state. For example, a peer in the listen state may receive a discovery request sent by another peer and return a discovery response frame, such as a probe response. As a result, successful discovery may require one peer to be in the listen state while the other peer is in the search state. If a peer is operating in one state and the other peer is in the same state, a discovery opportunity may not exist. By employing the techniques of this disclosure, a multi concurrent peer such as peer 102 may simultaneously operate in the listen state with transceiver 202 and in the search state with transceiver 208 to increase discovery opportunities.

Figure 3:
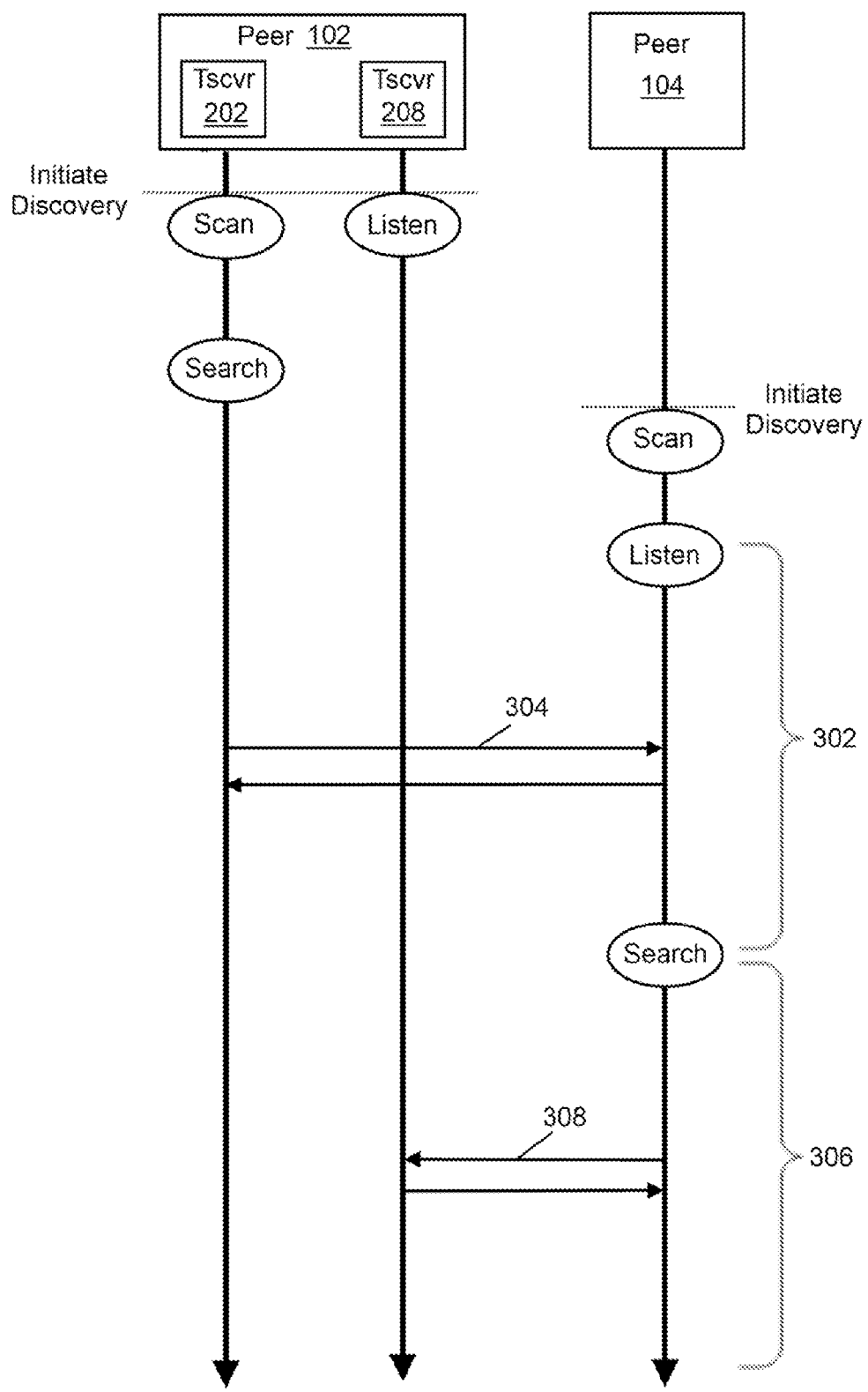
FIG. 3 depicts a sequence diagram of a device discovery protocol conducted using a multi concurrent peer, according to one embodiment of the invention.

In one embodiment, P2P manager 224 may be configured to facilitate a device discovery protocol involving peer 102 and one or more peers, such as peer 104 and peer 106. A sequence diagram showing an exemplary discovery protocol between peer 102 and peer 104 is depicted in FIG. 3. For the purposes of this example, peer 102 is a multi concurrent device as described above and is described in the context of acting as group owner. Further, peer 104 may be a conventional or legacy peer that does not have multi concurrent capability. Peers 102 and 104 are described in these roles only for the purpose of illustration and in other embodiments, may function in any other suitable role. P2P manager 224 may coordinate operation between transceiver 202 and transceiver 208 and control the exchange of messages over the transceivers associated with performing a discovery process in a peer-to-peer network. As shown, P2P manager 224 may initiate a find phase to perform device discovery by using transceiver 202 to scan for existing networks and then operate in the search state by transmitting probe requests on each channel of a defined subset of wireless channels. Simultaneously, transceiver 208 may operate in the listen state so that it may receive discovery requests, such as probe requests or beacons, sent by another peer, such as peer 104.

Next, peer 104 may initiate the find phase by first scanning for existing networks and then entering the listen state. Upon entering the listen state, a discovery opportunity exits as indicated by region 302. Successful discovery may occur during any portion of the discovery window shown while peer 104 is in the listen state and transceiver 202 of peer 102 is sending discovery requests. An example of a successful discovery process is indicated by the exchange of discovery messages 304. If discovery does not occur during the first listen state of peer 104, peer 104 may be configured to cycle to the search state after a random period. This represents another discovery opportunity as indicated by region 306 and discovery may occur when peer 104 transmits a discovery request which may be received by transceiver 208 in the listen state. Upon receipt of the discovery request, P2P manager 224 may cause transceiver 208 to transmit a discovery response. An example of a successful discovery process in this configuration is indicated by the exchange of discovery messages 308.

As demonstrated in FIG. 3, one transceiver of peer 102 may be in the listen or the search state that complements the state of peer 104. When peer 104 is in the listen state, transceiver 202 may be in the search state. Correspondingly, when peer 104 is in the search state, transceiver 208 may be in the listen state. Regardless of the state of peer 104, an exchange of discovery messages between peer 102 and peer 104 may occur, allowing a successful discovery process. By having one transceiver in the complementary state, a discovery opportunity exists, allowing peer 102 and peer 104 to arrive at a common channel.

In contrast, a conventional discovery process between devices having a single transceiver may have to wait until each device has cycled through random periods of operation in the search state and the listen state until an overlap between complementary states occurs. Accordingly, the techniques of this disclosure may represent an improvement in efficiency of the discovery process by reducing the potential for delay until peer 102 and peer 104 are in complementary discovery states.

Figure 4:
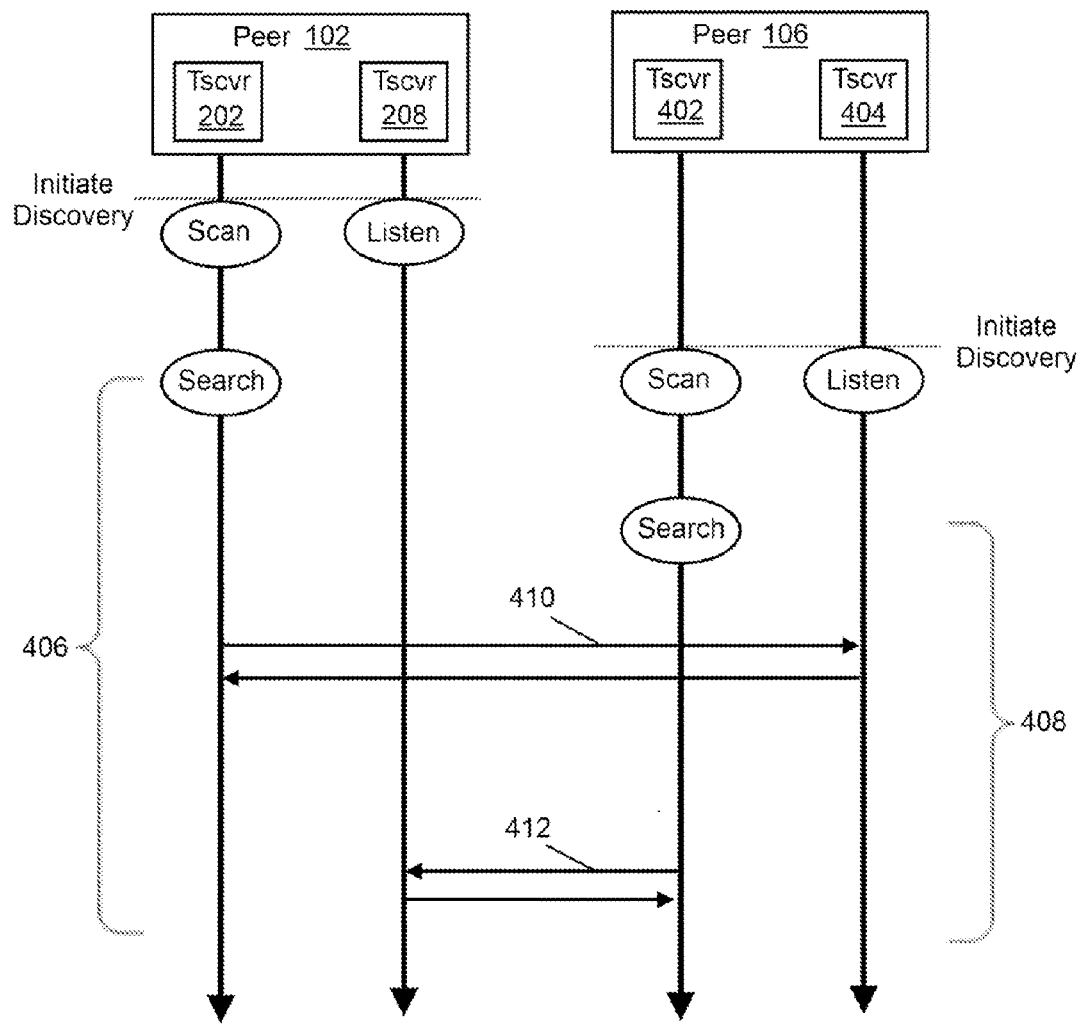
FIG. 4 depicts a sequence diagram of a device discovery protocol conducted using two multi concurrent peers, according to one embodiment of the invention.

In another aspect, a sequence diagram showing an exemplary device discovery protocol between peer 102 and peer 106 is depicted in FIG. 4. For the purposes of this example, peer 102 is a multi concurrent device as described above and is described in the context of acting as group owner. Further, peer 106 may also be a multi concurrent device. Peers 102 and 106 are described in these roles only for the purpose of illustration and in other embodiments, may function in any other suitable role. As described with regard to FIG. 3, P2P manager 224 may coordinate operation so that transceiver 202 scans and then enters the search state and transceiver 208 enters the listen state. Since peer 106 is also a multi concurrent device, it may be configured to initiate a device discovery protocol in a similar manner as peer 102. Accordingly, peer 106 may include a first transceiver 402 that scans and then enters the search state and a second transceiver 404 that enters the listen state.

Once in this configuration, two discovery opportunities may exist at a given time. A discovery opportunity represented by region 406 may correspond to transceiver 202 being in the search state and transceiver 404 being in the listen state. Another discovery opportunity represented by region 408 may correspond to transceiver 402 being in the search state and transceiver 208 being in the listen state. For example, a successful discovery may result from a discovery request being sent by transceiver 202 of peer 102, received and responded to by transceiver 404 of peer 106 as indicated by discovery message exchange 410. Correspondingly, a successful discovery may also result from a discovery request being sent by transceiver 402 of peer 106, received and responded to by transceiver 208 of peer 102 as indicated by discovery message exchange 408. As desired, P2P manager 224 may be configured to perform parallel discovery processes, thereby reducing the amount of time necessary for peer 102 and peer 106 to arrive at a common channel.

Figure 5:
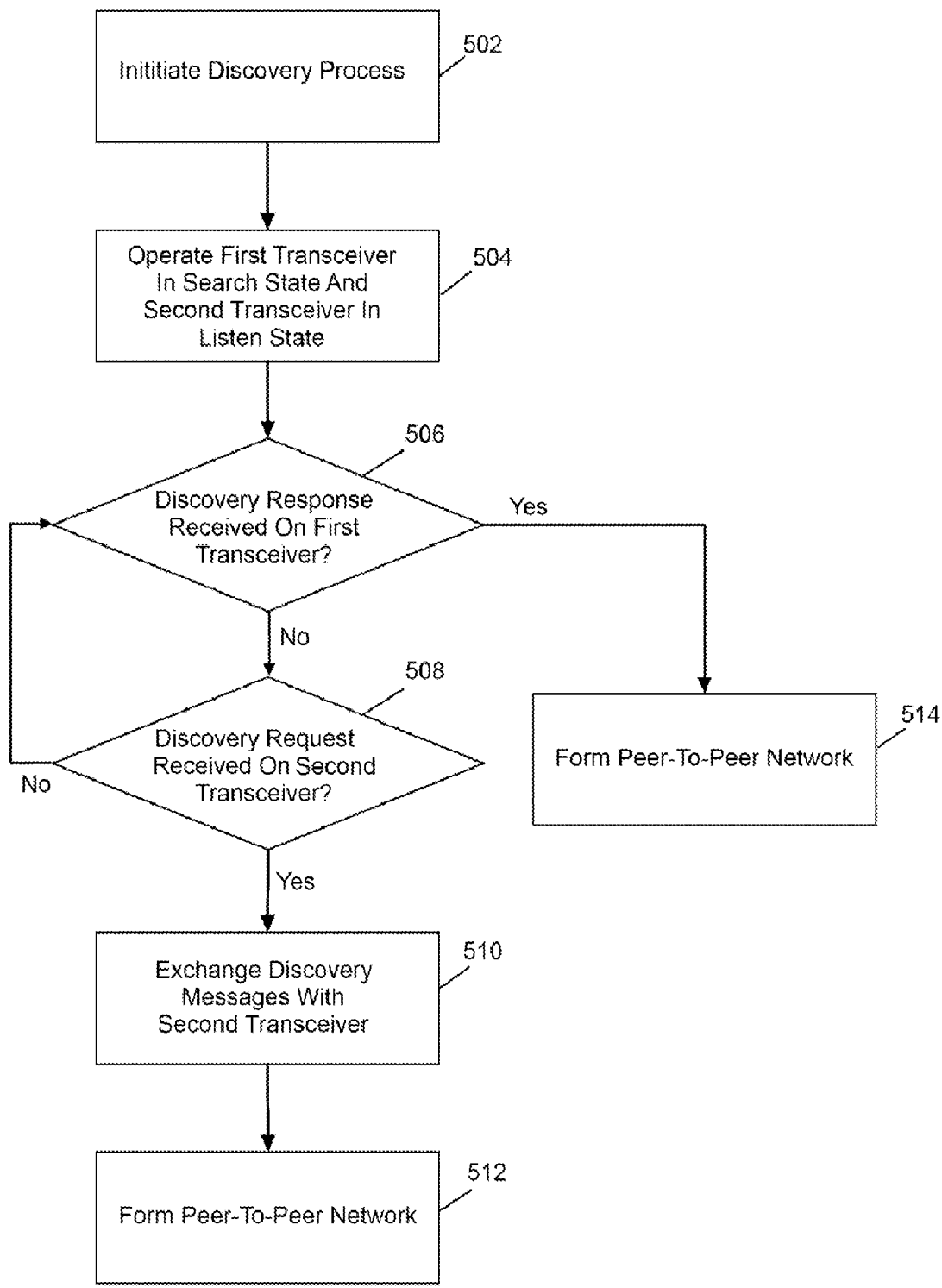
FIG. 5 is a flow chart showing an exemplary routine for conducting a device discovery protocol with a multi concurrent peer, according to one embodiment of the invention.

To help illustrate the techniques of this disclosure with regard to employing a multi concurrent peer to simultaneously fulfill multiple operational functions associated with a peer-to-peer network, FIG. 5 depicts a flow chart representing one exemplary routine that provides an efficient device discovery process. Beginning with 502, P2P manager 224 of peer 102 may initiate a device discovery protocol. In 504, P2P manager 224 may cause transceiver 202 to perform a scan of the wireless channels and then operate in the search state and may cause transceiver 208 to operate in the listen state. In 506, P2P manager 224 may monitor transceiver 202 to determine whether a discovery response is received from a peer in the listen state. While no response is received, the routine may continue to 508 and P2P manager 224 may monitor transceiver 208 for incoming discovery requests. If a discovery request is received, P2P manager 224 may coordinate a probe response to complete the discovery message exchange in 510 and form the peer-to-peer network in 512. If no discovery request is received in 508, the process may return to 506 to determine if a probe response has been received by transceiver 202. When a probe response is received, the routine may progress to 514 and P2P manager 224 may complete operations associated with forming the peer-to-peer network. Although the process of monitoring transceiver 202 and transceiver 208 for discovery responses and discovery requests is described as occurring sequentially, these operations may be performed in parallel as desired.

By following the techniques of this disclosure, a multi concurrent peer may be configured to simultaneously fulfill multiple operational functions associated with a peer-to-peer network. In addition to facilitation of the discovery process described above, other operational functions may be performed in parallel to improve performance. In one embodiment, the operational functions may include management of the peer-to-peer network.

Formation of a communication link in a peer-to-peer network may involve assignment of group ownership to one device following a successful group negotiation procedure after the discovery operation. The group owner (GO) may then maintain communications with the discovered peer on a negotiated wireless channel. However, it may also be desirable for the GO to continue performing device discovery operations by operating in the listen and search states to enable discovery and formation of a communication link with another device. Since the listen and search states may be performed on a different wireless channel, the GO may need to suspend operation with regard to the connected device for a period of time to accommodate the discovery process. Conventionally, this period of suspension may be coordinated using the notice of absence (NoA) information element in a frame exchanged with the connected device.

Figure 6:
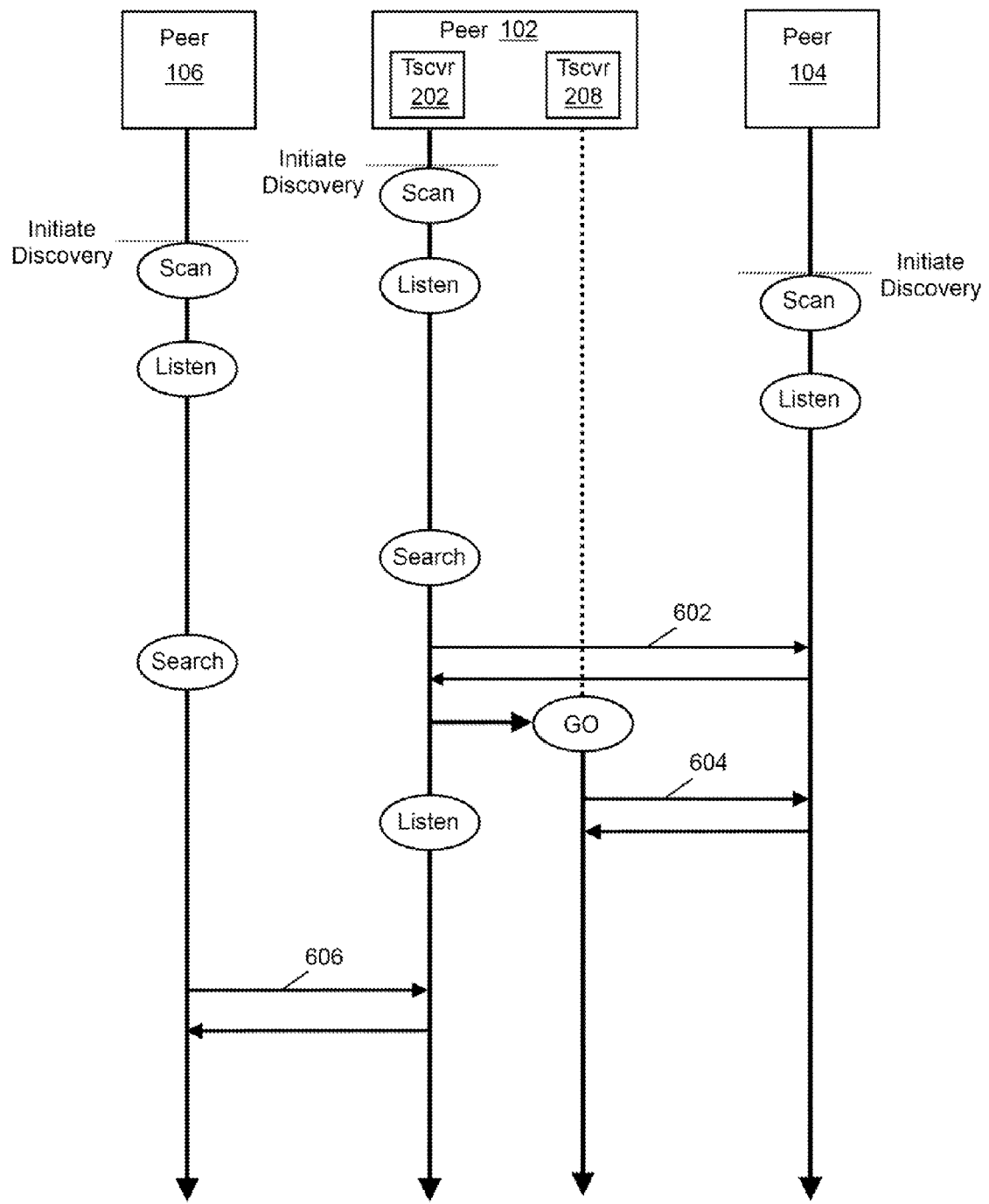
FIG. 6 depicts a sequence diagram showing multiple operations associated with a peer-to-peer network performed in parallel, according to one embodiment of the invention.

By employing the techniques of this disclosure, peer 102 operating in GO capacity may employ the multiple concurrent transceivers to perform network management while simultaneously maintaining a communication link with a discovered peer. For example, P2P manager 224 may be configured to use transceiver 202 to maintain a communication link with an already discovered device or devices, such as peer 104 and to use transceiver 208 to perform a conventional device discovery protocol with another wireless communications device, such as peer 106, as shown in the sequence diagram depicted in FIG. 6. In a manner similar to that depicted in FIG. 3, peer 102 may first perform a device discovery protocol with respect to peer 104. Although not depicted, transceiver 202 and transceiver 208 may be used to perform the search and listen states in parallel as desired. P2P manager 224 may initiate a find phase involving cycling between the search state and the listen state as described above. The protocol may commence by scanning for existing networks and then operating in the listen state to await reception of a discovery request. In one embodiment, transceiver 202 may cycle to the search state after a random period of time and begin transmitting discovery requests. As shown, peer 104 may be operating in a listen state during this period, resulting in a discovery opportunity. Following a successful discovery message exchange 602, group ownership may be negotiated. P2P manager 224 may then maintain the communication link with peer 104 by using transceiver 208 to perform group operational functions, such as exchanging data 604 with peer 104.

P2P manager 224 may also use transceiver 202 to continue conducting the device discovery protocol with respect to additional peers, such as peer 106. As shown, transceiver 202 may continue cycling between the listen state and the search state. When peer 106 is in a complementary state, for example when transceiver 202 is in the listen state and when peer 106 is in the search state, discovery message exchange 606 may be performed.

Although peer 102 may not devote both transceivers to the discovery process when maintaining the peer-to-peer network, gains in efficiency and performance may be realized. By employing transceiver 208 to maintain the peer communication link and transceiver 202 for the discovery process, peer 102 does not need to negotiate an absence with regard to peer 104 in order to perform device discovery processes, including such a process with peer 106.

Figure 7:
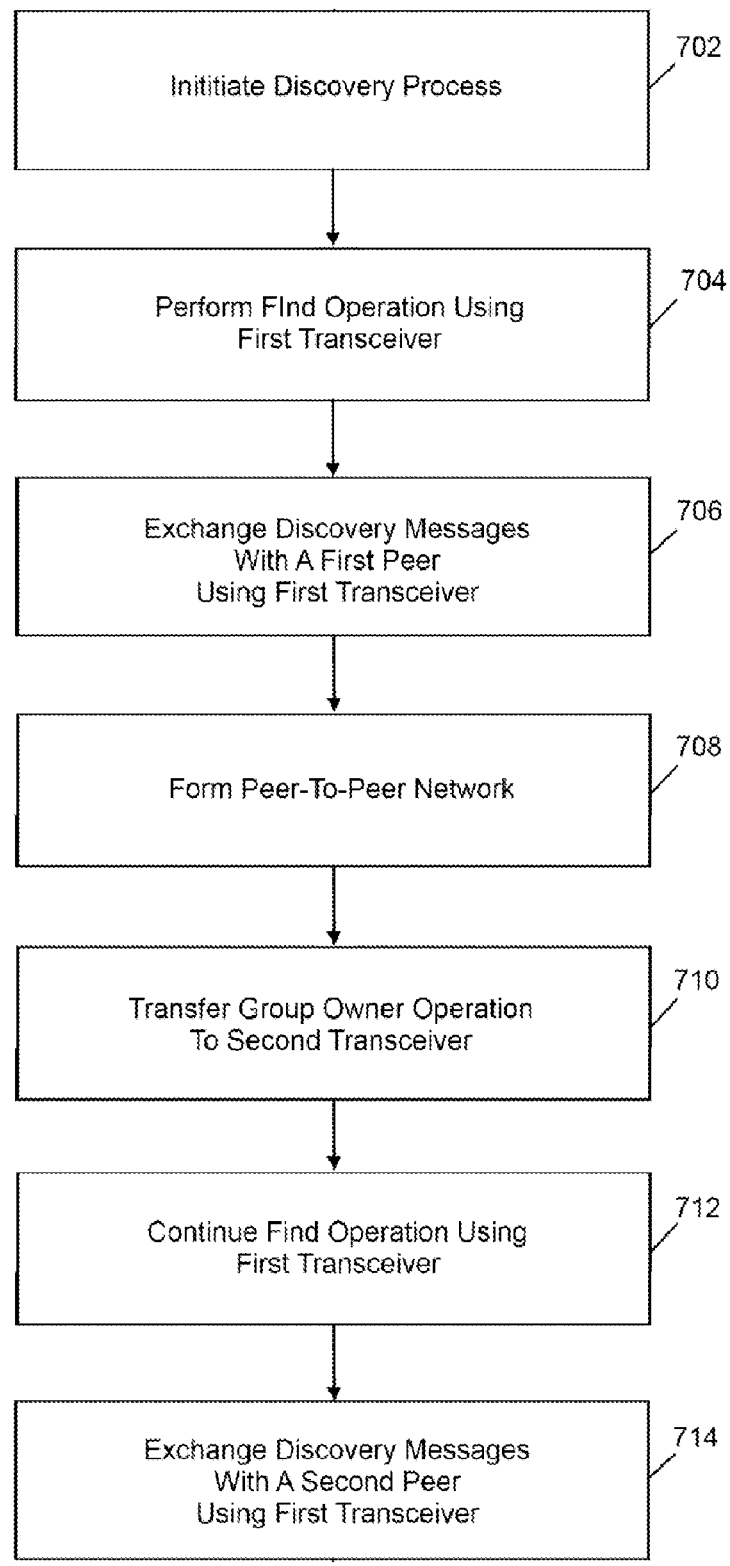
FIG. 7 is a flowchart showing an exemplary routine for performing multiple operations associated with a peer-to-peer network in parallel, according to one embodiment of the invention.

To help illustrate the techniques of this disclosure with regard to employing a multi concurrent peer to simultaneously fulfill multiple operational functions associated with a peer-to-peer network, FIG. 7 depicts a flow chart representing one exemplary routine that provides parallel operational functions. Beginning with 702, P2P manager 224 of peer 102 may initiate a device discovery protocol. In 704, P2P manager 224 may cause transceiver 202 to perform a find phase that may involve scanning the wireless channels and then cycling operation between the search state and the listen state. A successful discovery may occur in 706 when transceiver 202 exchanges discovery messages with a first peer, either by receiving a discovery response while in the search state or by transmitting a discovery response while in the listen state. P2P manager 224 may then form a peer-to-peer network with the first peer in 708 and transfer operation as group owner to transceiver 208 to maintain the communication link with the first peer in 710. P2P manager 224 may continue to operate transceiver 202 in the find phase, by cycling between the search and listen states as indicated by 712. Accordingly, transceiver 202 may conduct a discovery message exchange with a second peer in 714 while continuing to maintain the communication link with the first peer using transceiver 208.

Described herein are presently preferred embodiments. However, one skilled in the art that pertains to the present invention will understand that the principles of this disclosure can be extended easily with appropriate modifications to other applications. For example, even though embodiments have been disclosed that include dual concurrent devices, these techniques may be extended to devices having three or more independent transceivers to perform a corresponding number of operations in parallel.

What is claimed is:

1. A wireless communications device for performing multiple parallel operations in a peer-to-peer network, comprising:
   a first transceiver to exchange messages with at least one peer for performing a first operation associated with a peer-to-peer network;
   a second transceiver to exchange messages with at least one peer for performing a second operation associated with the peer-to-peer network; and
   a peer-to-peer manager to coordinate operation of the first transceiver and the second transceiver to perform the first operation and the second operation in parallel, wherein the first transceiver and the second transceiver are independent.

2. The wireless communications device of claim 1, wherein the first operation and the second operation are find phases corresponding to a device discovery protocol.

3. The wireless communications device of claim 2, wherein the peer-to-peer manager further to coordinate operation of the first transceiver by operating the first transceiver in a search state to transmit discovery requests.

4. The wireless communications device of claim 3, wherein the peer-to-peer manager to further coordinate operation of the first transceiver by forming the peer-to-peer network after receiving a discovery response.

5. The wireless communications device of claim 2, wherein the peer-to-peer manager to coordinate operation of the second transceiver by operating the second transceiver in a listen state to receive discovery requests.

6. The wireless communications device of claim 5, wherein the peer-to-peer manager to further coordinate operation of the second transceiver by transmitting a discovery response after receiving a discovery request and forming the peer-to-peer network.

7. The wireless communications device of claim 1, wherein the first operation is to maintain a communications link with a first peer over the peer-to-peer network and the second operation is a find phase corresponding to a device discovery protocol.

8. The wireless communications device of claim 7, wherein the peer-to-peer manager to coordinate operation of the second transceiver to cycle between operating the second transceiver in a listen state and operating the second transceiver in a search state.

9. The wireless communications device of claim 8, wherein the peer-to-peer manager to further coordinate operation of the second transceiver by:
    forming a communication link with a second peer when receiving a discovery response from the second peer; and
    transmitting a discovery response when receiving a discovery request from the second peer and forming a communication link with the second peer.

10. A method for wireless communication with a wireless communications device having a first transceiver and a second transceiver for performing multiple parallel operations in a peer-to-peer network wherein the first transceiver and the second transceiver are independent, comprising:
    performing a first operation associated with a peer-to-peer network with the first transceiver;
    performing a second operation associated with the peer-to-peer network with the first transceiver; and
    coordinating operation of the first transceiver and the second transceiver to perform the first operation and the second operation in parallel.

11. The method of claim 10, wherein the first operation and the second operation are find phases corresponding to a device discovery protocol.

12. The method of claim 11, wherein coordinating operation of the first transceiver comprises operating the first transceiver in a search state to transmit discovery requests.

13. The method of claim 12, wherein coordinating operation of the first transceiver further comprises forming the peer-to-peer network after receiving a discovery response.

14. The method of claim 11, wherein coordinating operation of the second transceiver comprises operating the second transceiver in a listen state to receive discovery requests.

15. The method of claim 14, wherein coordinating operation of the second transceiver further comprises transmitting a discovery response after receiving a discovery request and forming the peer-to-peer network.

16. The method of claim 10, wherein the first operation is to maintain a communications link with a first peer over the peer-to-peer network and the second operation is a find phase corresponding to a device discovery protocol.

17. The method of claim 16, wherein coordinating operation of the second transceiver comprises cycling between operating the second transceiver in a listen state and operating the second transceiver in a search state.

18. The method of claim 17, wherein coordinating operation of the second transceiver further comprises:
    forming a communication link with a second peer when receiving a discovery response from the second peer; and
    transmitting a discovery response when receiving a discovery request from the second peer and forming a communication link with the second peer.

19. A wireless communications device for performing multiple parallel operations in a peer-to-peer network, comprising:
    a first transceiver to exchange messages with at least one peer for performing a first operation associated with a peer-to-peer network;
    a second transceiver to exchange messages with at least one peer for performing a second operation associated with the peer-to-peer network; and
    means for coordinating operation of the first transceiver and the second transceiver to perform the first operation and the second operation in parallel, wherein the first transceiver and the second transceiver are independent.

20. The wireless communications device of claim 19, wherein the first operation and the second operation are find phases corresponding to a device discovery protocol.

21. The wireless communications device of claim 20, further comprising means for operating the first transceiver in a search state to transmit discovery requests.

22. The wireless communications device of claim 21, further comprising means for forming the peer-to-peer network after receiving a discovery response.

23. The wireless communications device of claim 20, further comprising means for operating the second transceiver in a listen state to receive discovery requests.

24. The wireless communications device of claim 23, further comprising means for transmitting a discovery response after receiving a discovery request and forming the peer-to-peer network.

25. The wireless communications device of claim 19, wherein the first operation is to maintain a communications link with a first peer over the peer-to-peer network and the second operation is a find phase corresponding to a device discovery protocol.

26. The wireless communications device of claim 25, further comprising means for cycling between operating the second transceiver in a listen state and operating the second transceiver in a search state.

27. The wireless communications device of claim 26, further comprising means for forming a communication link with a second peer when receiving a discovery response from the second peer and means for transmitting a discovery response when receiving a discovery request from the second peer and then forming a communication link with the second peer.

28. A non-transitory processor-readable storage medium for performing multiple parallel operations in a peer-to-peer network with a wireless communications device, the processor-readable storage medium having instructions thereon, the instructions comprising code for coordinating operation of a first transceiver to exchange messages with at least one peer in a peer-to-peer network and a second transceiver to exchange messages with at least one peer in the peer-to-peer network to perform a first operation using the first transceiver and a second operation with the second transceiver in parallel, wherein the first transceiver and the second transceiver are independent.

29. The storage medium of claim 28, wherein the first operation and the second operation are find phases corresponding to a device discovery protocol.

30. The storage medium of claim 29, further comprising code for operating the first transceiver in a search state to transmit discovery requests.

31. The storage medium of claim 30, further comprising code for forming the peer-to-peer network after receiving a discovery response.

32. The storage medium of claim 29, further comprising code for operating the second transceiver in a listen state to receive discovery requests.

33. The storage medium of claim 32, further comprising code for transmitting a discovery response after receiving a discovery request and forming the peer-to-peer network.

34. The storage medium of claim 28, wherein the first operation is to maintain a communications link with a first peer over the peer-to-peer network and the second operation is a find phase corresponding to a device discovery protocol.

35. The storage medium of claim 34, further comprising code for cycling between operating the second transceiver in a listen state and code for operating the second transceiver in a search state.

36. The storage medium of claim 35, further comprising code for forming a communication link with a second peer when receiving a discovery response from the second peer and code for transmitting a discovery response when receiving a discovery request from the second peer and then forming a communication link with the second peer.

* * * * *